(12) United States Patent
Shiota et al.

(10) Patent No.: US 9,228,698 B2
(45) Date of Patent: Jan. 5, 2016

(54) TERAHERTZ WAVE GENERATING DEVICE WHICH OUTPUTS A TERAHERTZ FREQUENCY ELECTROMAGNETIC WAVE VIA CHERENKOV PHASE MATCHING

(75) Inventors: Kazunori Shiota, Miyagi (JP); Eiji Kato, Miyagi (JP)

(73) Assignee: ADVANTEST CORPORATION, Tokyo (JP)

( * ) Notice: Subject to any disclaimer, the term of this patent is extended or adjusted under 35 U.S.C. 154(b) by 0 days.

(21) Appl. No.: 13/818,123

(22) PCT Filed: Aug. 11, 2011

(86) PCT No.: PCT/JP2011/068639
§ 371 (c)(1),
(2), (4) Date: Mar. 28, 2013

(87) PCT Pub. No.: WO2012/035924
PCT Pub. Date: Mar. 22, 2012

(65) Prior Publication Data
US 2013/0181146 A1    Jul. 18, 2013

(30) Foreign Application Priority Data
Sep. 17, 2010    (JP) .................. 2010-209797

(51) Int. Cl.
*A61N 5/06*    (2006.01)
*F21K 2/00*    (2006.01)
*G02F 1/35*    (2006.01)
*G02F 1/365*    (2006.01)
*G02F 1/37*    (2006.01)

(52) U.S. Cl.
CPC . *F21K 2/00* (2013.01); *G02F 1/353* (2013.01); *G02F 1/365* (2013.01); *G02F 2001/374* (2013.01); *G02F 2203/13* (2013.01)

(58) Field of Classification Search
CPC .................. H03B 2200/0084; G01N 21/3581; G01N 21/3586
USPC ....................................... 250/504 R
See application file for complete search history.

(56) References Cited

U.S. PATENT DOCUMENTS

2005/0185542 A1* 8/2005 Iwase .......................... 369/47.19
2008/0265165 A1* 10/2008 Yeh et al. ................... 250/341.1

(Continued)

FOREIGN PATENT DOCUMENTS

JP          2-275418          11/1990

OTHER PUBLICATIONS

Suizu et al., Cherenkov Phase Matched Monochromatic Tunable Terahertz Wave Generation, Recent Optical and Photonic Technologies, ISBN 978-953-7619-71-8, Jan. 2010, pp. 125-139.*

(Continued)

*Primary Examiner* — Jack Berman
*Assistant Examiner* — Jason McCormack
(74) *Attorney, Agent, or Firm* — Greenblum & Bernstein, P.L.C.

(57) ABSTRACT

An electromagnetic wave emission device includes a nonlinear crystal which receives exciting light Lp having two wavelength components $\lambda 1$ and $\lambda 2$, and outputs terahertz waves L1-L6, a total reflection layer which is in contact with the nonlinear crystal, and totally reflects the terahertz waves L2, L4, and L6 output from the nonlinear crystal, a substrate which mounts the total reflection layer, and top clads which are placed on an opposing surface of the nonlinear crystal, and transmit the terahertz waves L1-L6.

10 Claims, 5 Drawing Sheets

(56) References Cited

U.S. PATENT DOCUMENTS

2008/0298757 A1* 12/2008 Dunn et al. .................. 385/122
2010/0148050 A1* 6/2010 Bari ............................. 250/271
2010/0276612 A1* 11/2010 Norwood et al. ......... 250/504 R
2011/0032601 A1* 2/2011 Kondo et al. ................ 359/330
2011/0147621 A1* 6/2011 Ohtake et al. ............ 250/504 R
2012/0261577 A1* 10/2012 Peytavit et al. ............ 250/338.4
2013/0037721 A1 2/2013 Ouchi
2013/0068971 A1 3/2013 Shiota
2013/0075597 A1 3/2013 Shiota et al.

OTHER PUBLICATIONS

K. Suizu et al., "Extremely frequency-widened terahertz wave generation using Cherenkov-type radiation", Optics Express, 17(8), Apr. 13, 2009, pp. 6676-6681.

K. Suizu et al., "Surface emitted THz-wave generation/amplification using ridge type PPLN", Conference on Lasers and Electro-Optics, May 21, 2006, pp. 1-2.

U.S. Appl. No. 13/862,560 to Kazunori Shiota et al., filed Apr. 15, 2013.

International Search Report, mail date is Sep. 13, 2011.

* cited by examiner

TERAHERTZ WAVE GENERATING DEVICE WHICH OUTPUTS A TERAHERTZ FREQUENCY ELECTROMAGNETIC WAVE VIA CHERENKOV PHASE MATCHING

TECHNICAL FIELD

The present invention relates to an emission of electromagnetic waves (frequency thereof is equal to or more than 0.01 [THz], and equal to or less than 100 [THz]) (such as terahertz waves (frequency thereof is equal to or more than 0.03 [THz], and equal to or less than 10 [THz]), for example).

BACKGROUND ART

A broadband terahertz generation method by means of difference frequency terahertz wave generation using the Cherenkov radiation has conventionally been proposed (refer to FIG. 2 of Non-Patent Document 1). Exciting light from a light source (KTP-OPO excited by Nd-YAG laser, for example) outputting two wavelengths is made incident to a nonlinear crystal (MgO-doped LN (lithium niobate) crystal, for example) according to FIG. 2 of Non-Patent Document 1. The incident exciting light having the two wavelengths induces nonlinear polarization in the MgO-doped LN crystal. If the MgO-doped LN crystal satisfies the condition ($n_{THz} > n_{opt}$) of the Cherenkov radiation, a spherical wave which takes the maximal value at each position corresponding to the twice of the coherence length is generated. This spherical wave has a wave front aligned in a direction of a radiation angle θ satisfying the following relationship, and the terahertz waves are emitted in this direction. It should be noted that $n_{opt}$ denotes a refractive index in the exciting light waveband of the MgO-doped LN crystal, and $n_{THz}$ is a refractive index in the terahertz waveband of the MgO-doped LN crystal.

$$\cos \theta = n_{opt}/n_{THz}$$

On this occasion, the MgO-doped LN crystal is formed on an LN substrate which is not doped. The terahertz wave (Cherenkov light) generated in the MgO-doped LN crystal is a spherical wave, and is radiated extending in a conical shape. Thus, terahertz waves departing from the non-doped LN substrate, and a terahertz wave proceeding toward the non-doped LN substrate exist in the terahertz waves generated in the MgO-doped LN crystal.

(Non-Patent Document 1) K. Suizu, K. Koketsu, T. Shibuya, T. Tsutsui, T. Akiba, and K. Kawase, "Extremely frequency-widened terahertz wave generation using Cherenkov-type radiation," Opt. Express 17(8), 6676-6681 pages, 2009

SUMMARY OF THE INVENTION

On this occasion, the LN crystal presents high absorption in the terahertz waveband, and the terahertz waves traveling toward the non-doped LN substrate is absorbed in the LN substrate, and is thus attenuated. As a result, only the terahertz waves traveling in the direction departing from the non-doped LN substrate can be used. However, this configuration is not effective in the generation of the terahertz waves, and it is difficult to sufficiently increase output power of the terahertz waves.

It is therefore an object of the present invention to increase the output power of the terahertz waves.

According to the present invention, an electromagnetic wave emission device includes: a nonlinear crystal that receives exciting light having at least two wavelength components, and outputs an electromagnetic wave having a frequency equal to or more than 0.01 [THz] and equal to or less than 100 [THz] by means of the Cherenkov phase matching; and a total reflection layer that is in contact with the nonlinear crystal, and totally reflects the electromagnetic wave output from the nonlinear crystal.

According to the thus constructed electromagnetic wave emission device, a nonlinear crystal receives exciting light having at least two wavelength components, and outputs an electromagnetic wave having a frequency equal to or more than 0.01 [THz] and equal to or less than 100 [THz] by means of the Cherenkov phase matching. A total reflection layer is in contact with the nonlinear crystal, and totally reflects the electromagnetic wave output from the nonlinear crystal.

According to the electromagnetic wave emission device of the present invention, a thickness t of the nonlinear crystal may satisfy the following equation:

$$t \leq \lambda/4n_{THz} - \delta_{THz}$$

where λ is a wavelength of the electromagnetic wave, $n_{THz}$ is a refractive index of the nonlinear crystal at the wavelength of the electromagnetic wave, and $\delta_{THz}$ is a penetration length of the electromagnetic wave in the total reflection layer.

According to the electromagnetic wave emission device of the present invention, the nonlinear crystal may include a contact surface in contact with the total reflection layer, and an opposing surface opposing the contact surface, and the electromagnetic wave emission device according to the present invention may include an electromagnetic wave transmission unit that is arranged on the side of the opposing surface with respect to the nonlinear crystal, and transmits the electromagnetic wave.

According to the electromagnetic wave emission device of the present invention, a refractive index $n_{opt_{cl}}$ of the electromagnetic wave transmission unit at the wavelength of the exciting light may be smaller than a refractive index $n_{opt}$ of the nonlinear crystal at the wavelength of the exciting light.

According to the electromagnetic wave emission device of the present invention, the electromagnetic wave transmission unit may include: an exciting light reflection unit which is in contact with the opposing surface of the nonlinear crystal, and a transmission unit that transmits the electromagnetic wave which has transmitted through the exciting light reflection unit, wherein a refractive index $n_{opt\_b}$ of the exciting light reflection unit at the wavelength of the exciting light may be smaller than the refractive index $n_{opt}$ of the nonlinear crystal at the wavelength of the exciting light.

According to the electromagnetic wave emission device of the present invention, a thickness $t_b$ of the exciting light reflection unit may be thinner than the wavelength λ of the electromagnetic wave so that the electromagnetic wave can transmit through the exciting light reflection unit; and the thickness $t_b$ of the exciting light reflection unit may be so thick that the exciting light cannot transmit through the exciting light reflection unit.

According to the present invention, the electromagnetic wave emission device may include a substrate that mounts the total reflection layer, wherein the total reflection layer is arranged between the nonlinear crystal and the substrate.

According to the electromagnetic wave emission device of the present invention, the exciting light may be a femtosecond optical pulse.

According to the electromagnetic wave emission device of the present invention, a width of a surface of the nonlinear crystal receiving the exciting light may be narrower than a width of the total reflection layer.

MODES FOR CARRYING OUT THE INVENTION

A description will now be given of an embodiment of the present invention referring to drawings.

Figure 1:
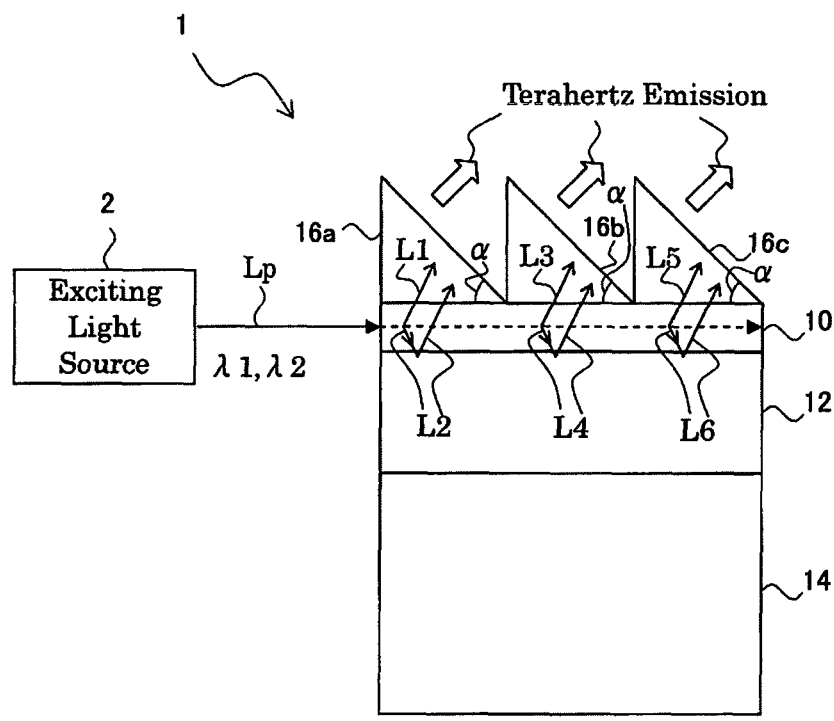
FIG. 1 is a front view of an electromagnetic wave emission device 1 according to the embodiment of the present invention.
Figure 2:
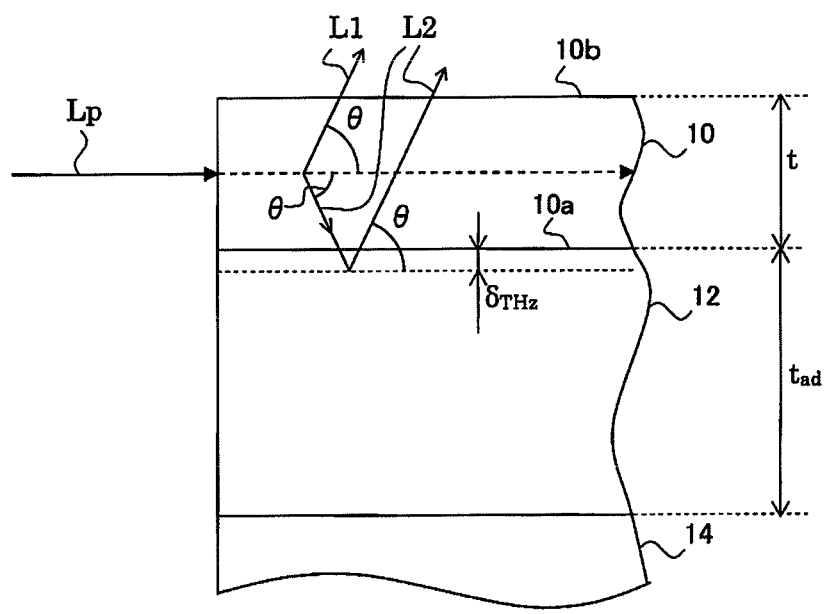
FIG. 2 is a partially enlarged front view of the electromagnetic wave emission device 1.

FIG. 1 is a front view of an electromagnetic wave emission device 1 according to the embodiment of the present invention. FIG. 2 is a partially enlarged front view of the electromagnetic wave emission device 1. It should be noted that top clads 16a, 16b, and 16c are not shown in FIG. 2.

The electromagnetic wave emission device 1 emits electromagnetic waves having a frequency equal to or more than 0.01 [THz] and equal to or less than 100 [THz]. The electromagnetic waves emitted from the electromagnetic wave emission device 1 are electromagnetic waves (terahertz waves) in the terahertz waveband (equal to or more than 0.03 [THz] and equal to or less than 10 [THz], for example). It is assumed that the electromagnetic waves emitted from the electromagnetic wave emission device 1 are terahertz waves in the embodiment of the present invention.

The electromagnetic wave emission device 1 includes an exciting light source 2, a nonlinear crystal 10, a total reflection layer 12, a substrate 14, and the top clads (electromagnetic wave transmission units) 16a, 16b, and 16c.

The exciting light source 2 outputs exciting light Lp having two wavelength components (wavelengths λ1 and λ2). The wavelengths λ1 and λ2 take values in a range equal to or more than 1250 nm and equal to or less than 1700 nm, for example. The exciting light Lp is a femtosecond optical pulse, for example. The femtosecond optical pulse includes wavelength components other than the two wavelength components (wavelengths λ1 and λ2), resulting in having two or more wavelength components.

The nonlinear crystal 10 is an MgO-doped LN crystal, for example. The exciting light Lp is made perpendicularly incident on a side surface (namely a YZ plane) of the nonlinear crystal 10. It should be noted that a polarization plane of the exciting light Lp is parallel with a Z axis (axis perpendicular to the page in FIG. 1). The two wavelength components of the exciting light Lp form nonlinear polarization in the nonlinear crystal 10, and electromagnetic waves (terahertz waves) having a frequency corresponding to the polarization are emitted. It should be noted that a relationship $n_{THz} > n_{opt}$ holds where $n_{opt}$ denotes a refractive index of the nonlinear crystal 10 at the wavelength of the exciting light Lp, and $n_{THz}$ denotes a refractive index of the nonlinear crystal 10 at the wavelength of the terahertz wave. The refractive indices for the two wavelengths (λ1, λ2) contained in the exciting light Lp are different from each other due to the refractive index dispersion of the nonlinear crystal 10. However, a difference between λ1 and λ2 is very small with respect to the wavelength of the terahertz waves, and influence of the refractive index dispersion between λ1 and λ2 is almost negligible. Thus, the refractive indices ($n_1$, $n_2$) (respectively corresponding to λ1, λ2) of the exciting light Lp (wavelengths λ1, λ2) in the nonlinear crystal are almost equal, and can be considered as $n_{opt}$.

If an angle satisfying the Cherenkov phase matching is θ, a relationship $\cos\theta = (\lambda_{THz}/n_{THz})/(\lambda 1 \lambda 2/(n_1\lambda 2 - n_2\lambda 1))$ holds. It should be noted that the wavelength of the terahertz wave is $\lambda_{THz}$.

The terahertz waves, which are spherical waves are emitted from the nonlinear crystal 10 in a direction at the angle θ satisfying the Cherenkov phase matching represented by the following equation (refer to FIG. 2). It should be noted that the angle θ is an angle between the travel direction of the exciting light Lp and the travel direction of the terahertz waves referring to FIG. 2. The following equation is an equation if it is considered that the relationship $n_1 = n_2 = n_{opt}$ holds in the relationship $\cos\theta = (\lambda_{THz}/n_{THz})/(\lambda 1 \lambda 2/(n_1\lambda 2 - n_2\lambda 1))$.

$$\cos\theta = n_{opt}/n_{THz}$$

As shown in FIG. 1, there are terahertz waves L1, L3, and L5 traveling upward, and terahertz waves L2, L4, and L6 traveling downward.

It should be noted that the nonlinear crystal 10 includes a contact surface 10a in contact with the total reflection layer 12 and an opposing surface 10b opposing the contact surface 10a. Moreover, a thickness t of the nonlinear crystal 10 is 3.8 μm, for example.

The total reflection layer 12 is an optical adhesive, for example. The total reflection layer 12 is in contact with the nonlinear crystal 10, and totally reflects the terahertz waves L2, L4, and L6 output from the nonlinear crystal 10. Based on the fact that the terahertz waves are totally reflected, a relationship $n_{MHz} > n_{THz\_ad}$ holds where $n_{THz\_ad}$ denotes the refractive index of the total reflection layer 12 at the wavelength of the terahertz waves. Moreover, based on the fact that the terahertz waves L2, L4, and L6 are totally reflected, the incident angle (π/2−θ) of the terahertz waves L2, L4, and L6 is larger than the critical angle. In other words, the following equation holds.

$$\arcsin(n_{THz\_ad}/n_{THz}) < \frac{\pi}{2} - \arccos(n_{opt}/n_{THz})$$

Moreover, in order for the exciting light traveling in the nonlinear crystal 10 not to transmit through the total reflection layer 12, but to be contained in the nonlinear crystal 10, a relationship $n_{opt} > n_{opt\_ad}$ needs to hold where the $n_{opt\_ad}$ denotes refractive index of the total reflection layer 12 at the wavelength of the exciting light.

Further, a thickness $t_{ad}$ of the total reflection layer 12 is set to be thicker than a penetration length $\delta_{THz}$ of the terahertz waves in the total reflection layer 12. In other words, the following equation holds. It should be noted that λ represents the wavelength of the terahertz waves emitted by the nonlinear crystal 10.

$$t_{ad} > \delta_{THz} = \frac{\lambda}{2\pi n_{THz}\sqrt{\sin^2(\frac{\pi}{2} - \arccos(n_{opt}/n_{THz})) - (\frac{n_{THz-ad}}{n_{THz}})^2}}$$

Considering the penetration of the terahertz waves in the total reflection layer 12, referring to FIG. 2, the terahertz wave L2 is totally reflected at a position inner by the penetration length $\delta_{THz}$ than the surface at which the total reflection layer 12 is in contact with the nonlinear crystal 10. If the total reflection layer 12 is thinner than the penetration length $\delta_{THz}$, the terahertz waves transmit through the total reflection layer 12, which is not preferred.

The total reflection layer 12 is mounted on the substrate 14. The total reflection layer 12 is arranged between the nonlinear crystal 10 and the substrate 14. The substrate 14 is an LN substrate, which is not doped, for example.

The top clads (electromagnetic wave transmission units) 16a, 16b, and 16c are arranged on the opposing surface 10b of the nonlinear crystal 10. In other words, the top dads 16a, 16b, and 16c are arranged on the side of the opposing surface 10b with respect to the nonlinear crystal 10. Moreover, the terahertz waves transmit through the top dads 16a, 16b, and 16c. The top dads 16a, 16b, and 16c are silicon prisms, for example. The top dads 16a, 16b, and 16c emit the terahertz waves (terahertz emission), and the terahertz waves can thus be extracted from the electromagnetic wave emission device 1. A configuration of preventing the terahertz waves from being totally reflected by properly setting an extraction angle α (refer to FIG. 1) is well known, and a detailed description thereof is therefore omitted.

In order for the terahertz waves to transmit through the top dads 16a, 16b, and 16c, the terahertz waves should not be totally reflected by the top dads 16a, 16b, and 16c. A relationship $n_{MHz} < n_{THz\_cl}$ needs to hold where $n_{THz\_cl}$ is a refractive index of the top dads 16a, 16b, and 16c at the wavelength of the terahertz waves. If a relationship $n_{THz} \geq n_{THz\_cl}$ holds, the incident angle ($\pi/2 - \theta$) of the terahertz waves L1-L6 needs to be less than the critical angle. In this case, the following equation holds.

$$\arcsin(n_{THz\_cl}/n_{THz}) > \frac{\pi}{2} - \arccos(n_{opt}/n_{THz})$$

Moreover, in order for the exciting light traveling in the nonlinear crystal 10 not to transmit through the top dads 16a, 16b, and 16c, but to be contained in the nonlinear crystal 10, a relationship $n_{opt} > n_{opt\_cl}$ needs to hold where $n_{opt\_cl}$ denotes the refractive index of the top dads 16a, 16b, and 16c at the wavelength of the exciting light.

A description will now be given of an operation of the embodiment of the present invention.

The exciting light Lp is fed to the nonlinear crystal 10 from the exciting light source 2. The exciting light Lp travels approximately straight in the nonlinear crystal 10. The two wavelength components (wavelengths λ1 and λ2) of the exciting light Lp form the nonlinear polarization in the nonlinear crystal 10, and the terahertz waves having the frequency corresponding to the polarization are emitted. Moreover, the travel direction of the terahertz waves emitted from the nonlinear crystal 10 satisfying the condition $n_{MHz} > n_{opt}$ forms the angle θ satisfying the Cherenkov phase matching with respect to the travel direction of the exciting light Lp.

The terahertz waves L1, L3, and L5 departing from the total reflection layer 12, and proceeding toward the top dads 16a, 16b, and 16c are emitted from the nonlinear crystal 10. Moreover, the terahertz waves L1, L3, and L5 transmit through the top dads 16a, 16b, and 16c.

Further, the terahertz waves L2, L4, and L6 are emitted from the nonlinear crystal 10 toward the total reflection layer 12. The terahertz waves L2, L4, and L6 are reflected by the total reflection layer 12, and travel toward the top dads 16a, 16b, and 16c. Then, the terahertz waves L2, L4, and L6 transmit through the top clads 16a, 16b, and 16c.

On this occasion, the travel direction of the terahertz wave L1 and the travel direction of the terahertz wave L2 after reflected by the total reflection layer 12 are parallel with each other. The same holds true for the terahertz waves L3 and L4, and for the terahertz waves L5 and L6.

The terahertz wave L1 and the terahertz wave L2 are opposite to each other in phase depending on an optical path difference between the terahertz wave L1 and the terahertz wave L2 on a terahertz wave front D (perpendicular to the travel direction of the terahertz wave L1), resulting in attenuation of the terahertz waves. A thickness t of the nonlinear crystal 10 is preferably set to be equal to or less than a predetermined value in order to prevent this condition. A description will now be given of the predetermined value ($\lambda/4n_{THz} - \delta_{THz}$).

Figure 3:
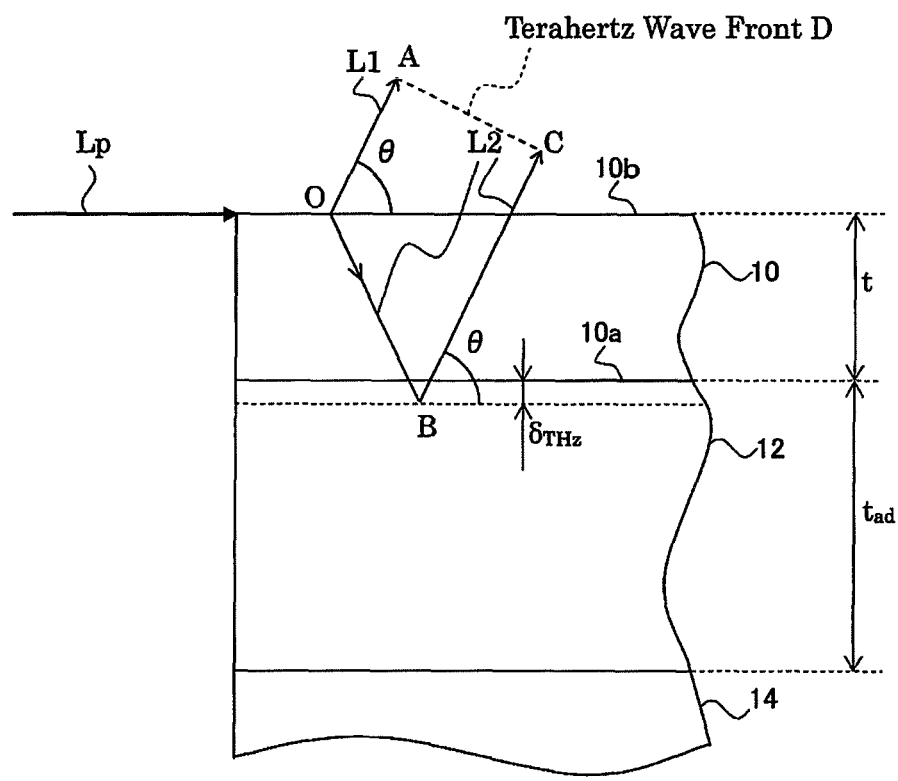
FIG. 3 is a diagram showing the optical paths of the terahertz wave L1 and the terahertz wave L2 if the exciting light Lp is made incident from a side to the highest portion (opposing surface 10b) of the nonlinear crystal 10.

FIG. 3 is a diagram showing the optical paths of the terahertz wave L1 and the terahertz wave L2 if the exciting light Lp is made incident from a side to the highest portion (opposing surface 10b) of the nonlinear crystal 10. The case shown in FIG. 3 can occur if the exciting light Lp has a beam diameter the diameter of which is the same as the thickness t of the nonlinear crystal 10.

It is assumed that both the terahertz wave L1 and the terahertz wave L2 are emitted from a point O. A difference between an optical path length OA of the terahertz wave L1 from the point O to the terahertz wave front D and an optical path length OB+OC of the terahertz wave L2 from the point O to the terahertz wave front D is an optical path difference Δ between the terahertz wave L1 and the terahertz wave L2. Thus, the optical path difference Δ between the terahertz wave L1 and the terahertz wave L2 is represented as $2(t+\delta_{THz}) \sin\theta$.

By the way, the optical path difference Δ is maximum if the point O is on the opposing surface 10b, and decreases as the point O approaches the contact surface 10a. Thus, the maximum value of the optical path difference Δ for the predetermined θ is $2(t+\delta_{THz})\sin\theta$. On this occasion, the maximum value of sin θ is 1. Thus, the maximum value of the optical path difference Δ is $2(t+\delta_{THz})$. Thus, if the maximum value $2(t+\delta_{THz})$ of the optical path difference Δ satisfies the following equation, the terahertz wave L1 and the terahertz wave L2 are not opposite to each other in phase on the terahertz wave front D.

$$2(t+\delta_{THz}) \leq \lambda/2n_{THz}$$

Thus, if the thickness t of the nonlinear crystal 10 satisfies the following equation, the terahertz wave L1 and the terahertz wave L2 are not opposite to each other in phase on the terahertz wave front D. It is thus possible to prevent the terahertz wave L1 and the terahertz wave L2 from attenuating each other on the terahertz wave front D.

$$t \leq \lambda/4n_{THz} - \delta_{THz}$$

According to the embodiment of the present invention, the terahertz waves L2, L4, and L6 emitted toward the total reflection layer 12 are reflected by the total reflection layer 12, and travel toward the top clads 16a, 16b, and 16c. Thus, the terahertz waves L2, L4, and L6 can be extracted via the top dads 16a, 16b, and 16c from the electromagnetic wave emission device 1.

According to a technology described in Non-Patent Document 1 (refer to FIG. 2), terahertz waves corresponding to terahertz waves L2, L4, and L6 are absorbed by the substrate 14. Compared with the conventional technology, according to the embodiment of the present invention, in addition to the terahertz waves L1, L3, and L5, the terahertz waves L2, L4, and L6 having a power at approximately the same level can be extracted from the electromagnetic wave emission device 1, and the output power of the terahertz waves can be increased approximately twice.

Moreover, the thickness t of the nonlinear crystal 10 is set to equal to or less than the predetermined value ($\lambda/4n_{THz} - \delta_{THz}$), and it is thus possible to prevent the terahertz wave L2 emitted toward the total reflection layer 12 and the terahertz wave L1 emitted so as to depart from the total reflection layer 12 from being opposite to each other in phase on the terahertz wave front D, thereby attenuating each other.

It should be noted that various variations of the electromagnetic wave emission device 1 according to the embodiment of the present invention are conceivable.

Figure 4:
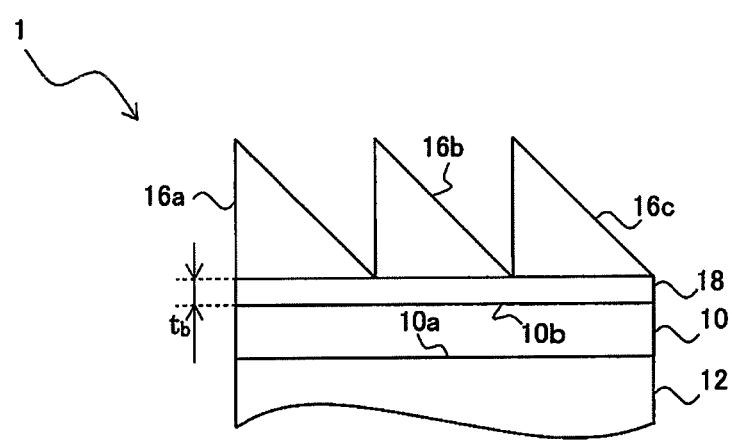
FIG. 4 is a front view of the electromagnetic wave emission device 1 according to a first variation of the present invention.

FIG. 4 is a front view of the electromagnetic wave emission device 1 according to a first variation of the present invention. It should be noted that the exciting light source 2 and the substrate 14 are not shown in FIG. 4. The electromagnetic wave emission device 1 according to the first variation is provided with an exciting light reflection unit 18 between the top clads (transmission units) 16a, 16b, and 16c and the nonlinear crystal 10.

The exciting light reflection unit 18 is in contact with the opposing surface 10b of the nonlinear crystal 10. Moreover, in order for the exciting light traveling in the nonlinear crystal 10 not to transmit through the exciting light reflection unit 18, and thus to be contained in the nonlinear crystal 10, a refractive index $n_{opt\_b}$ of the exciting light reflection unit 18 at the wavelength of the exciting light Lp is set to be smaller than the refractive index $n_{opt}$ of the nonlinear crystal 10 at the wavelength of the exciting light.

Moreover, a thickness $t_b$ of the exciting light reflection unit 18 is equal to or less than ¼ of the wavelength $\lambda$ of the terahertz waves emitted by the nonlinear crystal 10 so that the terahertz waves can transmit through the exciting light reflection unit 18. Further, the thickness $t_b$ of the exciting light reflection unit 18 is so thick that the exciting light Lp cannot transmit through the exciting light reflection unit 18.

It should be noted that the top clads (transmission units) 16a, 16b, and 16c are the same as those of the embodiment of the present invention. However, the exciting light reflection unit 18 is provided, and the relationship $n_{opt} > n_{opt\_cl}$ may thus not be hold.

Figure 5:
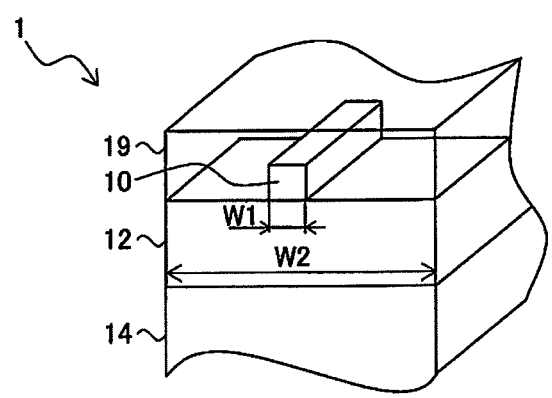
FIG. 5 is a side view of the electromagnetic wave emission device 1 according to a second variation of the present invention.

FIG. 5 is a side view of the electromagnetic wave emission device 1 according to a second variation of the present invention. It should be noted that the exciting light source 2 and the top dads 16a, 16b, and 16c are not shown in FIG. 5. Moreover, an adhesive layer 19 is shown in a transparent manner in FIG. 5.

Though a slab waveguide is shown in FIGS. 1 to 4, the nonlinear crystal 10 may be in a ridge form, thereby forming the waveguide as a ridge waveguide as shown in FIG. 5. In other words, a width W1 of a surface of the nonlinear crystal 10 receiving the exciting light Lp may be narrower than a width W2 of the total reflection layer 12. In this case, the adhesive layer 19 is arranged on the total reflection layer 12, and encloses, along with the total reflection layer 12, the nonlinear crystal 10. The top dads 16a, 16b, and 16c are arranged on the adhesive layer 19. The power density of the exciting light Lp can be increased by decreasing the width W1 of the nonlinear crystal 10, thereby further increasing the efficiency of extracting the terahertz waves from the electromagnetic wave emission device 1.

The invention claimed is:

1. An electromagnetic wave emission device comprising:
   a nonlinear crystal that receives exciting light having at least two wavelength components, and outputs a terahertz wave having a frequency equal to or more than 0.03 THz and equal to or less than 10 THz via Cherenkov phase matching; and
   a total reflection layer that is in contact with the nonlinear crystal, and totally reflects the terahertz wave output from the nonlinear crystal,
   wherein the total reflection layer is a single optical adhesive layer,
   wherein the nonlinear crystal includes a contact surface in contact with the total reflection layer, and an opposing surface opposing the contact surface, and
   wherein the electromagnetic wave emission device further comprises an electromagnetic wave transmitter that is arranged on a side of the opposing surface with respect to the nonlinear crystal, and transmits the terahertz wave.

2. The electromagnetic wave emission device according to claim 1, wherein a thickness t of the nonlinear crystal satisfies the following equation:

$$t \leq \lambda/4n_{THz} - \delta_{THz}$$

where $\lambda$ is a wavelength of the terahertz wave, $n_{THz}$ is a refractive index of the nonlinear crystal at the wavelength of the terahertz wave, and $\delta_{THz}$ is a penetration length of the terahertz wave in the total reflection layer.

3. The electromagnetic wave emission device according to claim 1, wherein a refractive index $n_{opt\_cl}$ of the electromagnetic wave transmitter at a wavelength of the exciting light is smaller than a refractive index $n_{opt}$ of the nonlinear crystal at the wavelength of the exciting light.

4. The electromagnetic wave emission device according to claim 1, wherein:
   the electromagnetic wave transmitter includes:
      an exciting light reflector which is in contact with the opposing surface of the nonlinear crystal, and
      a transmitter that transmits the terahertz wave which has transmitted through the exciting reflector,
   wherein a refractive index $n_{opt\_b}$ of the exciting light reflector at a wavelength of the exciting light is smaller than the refractive index $n_{opt}$ of the nonlinear crystal at the wavelength of the exciting light.

5. The electromagnetic wave emission device according to claim 4, wherein:
   a thickness $t_b$ of the exciting light reflector is thinner than a wavelength $\lambda$ of the terahertz wave so that the terahertz wave can transmit through the exciting light reflector; and
   the thickness $t_b$ of the exciting light reflector is so thick that the exciting light cannot transmit through the exciting light reflector.

6. The electromagnetic wave emission device according to claim 1, further comprising a substrate that mounts the total reflection layer, wherein the total reflection layer is arranged between the nonlinear crystal and the substrate.

7. The electromagnetic wave emission device according to claim 1, wherein the exciting light is a femtosecond optical pulse.

8. The electromagnetic wave emission device according to claim 1, wherein a width of a surface of the nonlinear crystal receiving the exciting light is narrower than a width of the total reflection layer.

9. The electromagnetic wave emission device according to claim 1, wherein the total reflection layer totally reflects the exciting light.

10. The electromagnetic wave emission device according to claim 1, wherein a thickness $t_{ad}$ of the total reflection layer is larger than a penetration length $\delta_{THz}$ of the terahertz wave.

* * * * *